US012761836B2

(12) United States Patent
Li et al.

(10) Patent No.: US 12,761,836 B2
(45) Date of Patent: Oct. 13, 2026

(54) DISK DATA READ/WRITE CONTROL METHOD, RELATED COMPONENT, AND FRONT-END SHARED CARD

(71) Applicant: IEIT SYSTEMS CO., LTD., Jinan (CN)

(72) Inventors: Hui Li, Jinan (CN); Shuai Zhao, Jinan (CN); Qinglin Liu, Jinan (CN)

(73) Assignee: IEIT SYSTEMS CO., LTD., Jinan (CN)

( * ) Notice: Subject to any disclaimer, the term of this patent is extended or adjusted under 35 U.S.C. 154(b) by 0 days.

(21) Appl. No.: 18/879,682

(22) PCT Filed: Aug. 30, 2023

(86) PCT No.: PCT/CN2023/115977

§ 371 (c)(1),
(2) Date: Dec. 27, 2024

(87) PCT Pub. No.: WO2024/139334

PCT Pub. Date: Jul. 4, 2024

(65) Prior Publication Data

US 2025/0383811 A1 Dec. 18, 2025

(30) Foreign Application Priority Data

Dec. 29, 2022 (CN) ......................... 202211701752.1

(51) Int. Cl.
*G06F 3/06* (2006.01)

(52) U.S. Cl.
CPC .......... *G06F 3/0659* (2013.01); *G06F 3/0617* (2013.01); *G06F 3/0661* (2013.01); *G06F 3/0689* (2013.01)

(58) Field of Classification Search
CPC .... G06F 3/0659; G06F 3/0617; G06F 3/0661; G06F 3/0689

(Continued)

(56) References Cited

U.S. PATENT DOCUMENTS 5,680,539 A 10/1997 Han et al.
7,849,259 B1 12/2010 Wong et al.

(Continued)

FOREIGN PATENT DOCUMENTS

CN 101281454 A 10/2008
CN 104216805 A 12/2014

(Continued)

OTHER PUBLICATIONS

International Search Report and Written Opinion for International Patent Application No. PCT/CN2023/115977 mailed Oct. 19, 2023, with English translation of Search Report.

(Continued)

*Primary Examiner* — Christopher B Shin
(74) *Attorney, Agent, or Firm* — Merchant & Gould P.C.

(57) ABSTRACT

Disclosed in the present disclosure are a method of controlling a read or write operation for disk data, a related component, and a front-end shared card. A first end of the front-end shared card is connected with a host through the M links, and the second end of the front-end shared card is respectively correspondingly connected with the disk through the N disk controllers. The front-end shared card is connected to the disk controllers, and if any one of the links has a fault and is disconnected, the host may still be connected to any one of the disk controllers through the front-end shared card, and therefore, the front-end shared card receives a read or write task request of the host, and controls, based on the read or write task request, a target disk controller to perform a read or write operation on the disk.

19 Claims, 2 Drawing Sheets

(58) Field of Classification Search
USPC ............................................................ 710/39
See application file for complete search history.

(56) References Cited

U.S. PATENT DOCUMENTS

| | | | | |
|---|---|---|---|---|
| 11,968,260 | B2 | 4/2024 | Han et al. | |
| 2005/0210130 | A1 | 9/2005 | Tanaka | |
| 2006/0047900 | A1* | 3/2006 | Tanaka | G06F 3/0614 711/E12.019 |
| 2006/0242380 | A1* | 10/2006 | Korgaonkar | G06F 3/0665 711/170 |
| 2007/0043902 | A1 | 2/2007 | Flake | |
| 2023/0403326 | A1* | 12/2023 | Han | G06F 15/17331 |
| 2025/0383811 | A1* | 12/2025 | Li | G06F 3/0617 |

FOREIGN PATENT DOCUMENTS

| | | | | |
|---|---|---|---|---|
| CN | 104410510 | A | 3/2015 | |
| CN | 104991737 | A | 10/2015 | |
| CN | 106020737 | A | 10/2016 | |
| CN | 112416248 | A | 2/2021 | |
| CN | 113608691 | A | 11/2021 | |
| CN | 114442925 | A | 5/2022 | |
| CN | 114528163 | A | 5/2022 | |
| CN | 115033521 | A | 9/2022 | |
| CN | 115657975 | A | 1/2023 | |
| EP | 3995965 | B1 * | 5/2025 | G06F 11/2089 |
| JP | 09288651 | A | 11/1997 | |
| WO | 2021012179 | A1 | 1/2021 | |

OTHER PUBLICATIONS

Chinese Search Report received for CN Application No. 202211701752 accessed Dec. 20, 2024, 2 pgs.

Luevisadpaibul, et al., "An FPGA Implementation of ATA Host Controller Toward Scalable iATA NAS", 2011 Eighth International Joint Conference on Computer Science and Software Engineering (JCSSE), pp. 229-233, May 2011.

* cited by examiner

DISK DATA READ/WRITE CONTROL METHOD, RELATED COMPONENT, AND FRONT-END SHARED CARD

CROSS-REFERENCE TO RELATED APPLICATION

The present application is a National Stage Application of PCT International Application No.: PCT/CN2023/115977 filed on Aug. 30, 2023, which claims priority to Chinese Patent Application 202211701752.1, filed in the China National Intellectual Property Administration on Dec. 29, 2022, the disclosure of which is incorporated herein by reference in its entirety.

TECHNICAL FIELD

The present disclosure relates to the field of host storage control, and in particular, a method of controlling read or write operation for disk data, a related component, and a front-end shared card.

BACKGROUND

In the related art, a host is connected to a dis through a disk controller. In order to read and write different disk spaces, a plurality of disk controller are arranged between the host and the disk, and each disk controller is connected to the host via a link. When a link fails, only the disk controllers connected to the links that do not fail may perform a read or write task request of the host, and the disk controller connected to the failed link is idled, leading to a reduction in storage performance, resources cannot be effectively used, especially in a link failure process, the risk of service downtime due to the inability of storage performance to meet requirements of clients may be caused.

SUMMARY

The present disclosure is intended to provide a method of controlling a read or write operation for disk data, a related component, and a front-end shared card. By providing a front-end shared card, it is ensured that a read or write operation between a host and a disk controller can be executed normally, and a normal connection between the host and the disk controller is also ensured, thereby ensuring the normal operation of a service.

In a first aspect, in order to solve the above technical problem, the present disclosure provides a method of controlling a read or write operation for disk data, applied to a front-end shared card, wherein a first end of the front-end shared card is connected with a host through M links, a second end of the front-end shared card is connected with a disk through N disk controllers, the front-end shared card and each of the disk controllers are connected through a built-in socket, and M and N are integers greater than 1; and the method comprises:

receiving a read or write task request of the host;

determining a target disk controller from the N disk controllers based on the read or write task request; and controlling, based on the read or write task request, the target disk controller to perform a read or write operation on the disk.

Further, the receiving a read or write task request of the host comprises:

scanning each of the disk controllers connected with the front-end shared card, and establishing a communication connection between the front-end shared card and each of the disk controllers; and receiving the read or write task request of the host after establishing a communication connection between the front-end shared card and the host.

Further, the receiving the read or write task request of the host after establishing the communication connection between the front-end shared card and the host comprises:

establishing the communication connection between the front-end shared card and the host after receiving a communication connection request of the host; and receiving the read or write task request of the host.

Further, the receiving a read or write task request of the host comprises:

establishing a request queue corresponding to the host; and reading the read or write task request that is written in the request queue by the host.

Further, the receiving a read or write task request of the host comprises:

establishing instruction queues corresponding to the disk controllers on a one-to-one basis; and receiving the read or write task request of the host;

the controlling, based on the read or write task request, the target disk controller to perform a read or write operation on the disk comprises:

converting the read or write task request into a read or write operation instruction; and writing the read or write operation instruction into an instruction queue corresponding to the target disk controller, to cause the target disk controller to read the read or write operation instruction in the instruction queue and perform the read or write operation on the disk.

Further, after establishing the instruction queues corresponding to the disk controllers on a one-to-one basis, the method further comprises:

establishing back-end feedback queues corresponding to the disk controllers on a one-to-one basis, wherein the target disk controller is further configured to write a read or write feedback signal into a back-end feedback queue corresponding to the target disk controller after the read or write operation instruction is completed;

after writing the read or write operation instruction into the instruction queue corresponding to the target disk controller, to cause the target disk controller to read the read or write operation instruction in the instruction queue and perform the read or write operation on the disk, the method further comprises:

reading the back-end feedback queue corresponding to the target disk controller to acquire the read or write feedback signal of the target disk controller.

Further, after establishing the instruction queues corresponding to the disk controllers on a one-to-one basis, the method further comprises:

establishing a front-end feedback queue corresponding to the host;

after reading the back-end feedback queue corresponding to the target disk controller to acquire the read or write feedback signal of the target disk controller, the method further comprises:

writing the read or write feedback signal into the front-end feedback queue corresponding to the host to cause the host to acquire the read or write feedback signal through the front-end feedback queue.

Further, the receiving a read or write task request of the host comprises:

establishing a response queue corresponding to the host; and receiving the read or write task request of the host;

after controlling, based on the read or write task request, the target disk controller to perform a read or write operation on the disk, the method further comprises:

writing data to be read sent by the target disk controller into the response queue to cause the host to read the data to be read corresponding to the read or write task request from the response queue.

Further, the disk comprises N disk regions corresponding to the N disk controllers on a one-to-one basis; and the determining a target disk controller from the N disk controllers based on the read or write task request comprises:

determining a target disk region from the N disk regions corresponding to the read or write task request; and determining the target disk controller corresponding to the target disk region.

Further, before receiving the read or write task request of the host, the method further comprises:

determining a target link of which a connection state is normal among the links between the front-end shared card and the host; and the receiving a read or write task request of the host comprises:

receiving the read or write task request of the host through the target link.

Further, the determining a target link of which a connection state is normal among the links between the front-end shared card and the host comprises:

detecting a connection state of each of the links between the front-end shared card and the host; and determining the target link of which the connection state is normal.

Further, after detecting the connection state of each of the links between the front-end shared card and the host, the method further comprises:

determining whether there is an abnormal link of which the connection state is abnormal among the links; and in a case where it is determined that there is an abnormal link of which the connection state is abnormal among the links, controlling a prompt module for providing a prompt.

Further, the prompt module is a voice prompt module and/or a light prompt module; and the controlling a prompt module for providing a prompt comprises:

controlling the voice prompt module for providing a voice prompt and/or controlling the light prompt module for providing a light prompt.

Further, the voice prompt module is a buzzer, and the light prompt module is a light emitting diode.

Further, the controlling, based on the read or write task request, the target disk controller to perform a read or write operation on the disk comprises:

converting, based on the write task request, a first format of data to be written corresponding to the write task request into a second format corresponding to the target disk controller, to cause the target disk controller to write the data to be written in the second format into the disk; or converting, based on the read task request, a second format of data to be read corresponding to the read task request into a first format corresponding to the host, to cause the host to read the data to be read in the first format corresponding to the host and sent by the target disk controller.

In a second aspect, in order to solve the above technical problem, the present disclosure provides a system of controlling a read or write operation for disk data, applied to a front-end shared card, wherein the first end of the front-end shared card is connected with a host through M links, the second end is connected with a disk through N disk controllers, the front-end shared card and each of the disk controllers are connected through a built-in socket, and M and N are integers greater than 1; and the system comprises:

a receiving unit, configured to receive a read or write task request of the host;

a determination unit, configured to determine a target disk controller based on the read or write task request; and a control unit, configured to control, based on the read or write task request, the target disk controller to perform a read or write operation on the disk.

The receiving unit is configured to perform the following operations:

scanning each of the disk controllers connected with the front-end shared card, and establishing a communication connection between the front-end shared card and each of the disk controllers; and receiving the read or write task request of the host after establishing a communication connection between the front-end shared card and the host.

Further, the receiving unit is configured to perform the following operations:

establishing the communication connection between the front-end shared card and the host after receiving a communication connection request of the host; and receiving the read or write task request of the host.

Further, the receiving unit is configured to perform the following operations:

establishing a request queue corresponding to the host; and reading the read or write task request that is written in the request queue by the host.

Further, the receiving unit is configured to perform the following operations:

establishing instruction queues corresponding to the disk controllers on a one-to-one basis; and receiving the read or write task request of the host;

The control unit is configured to perform the following operations:

converting the read or write task request into a read or write operation instruction; and writing the read or write operation instruction into an instruction queue corresponding to the target disk controller, to cause the target disk controller to read the read or write operation instruction in the instruction queue and perform the read or write operation on the disk.

Further, the receiving unit is further configured to establish back-end feedback queues corresponding to the disk controllers on a one-to-one basis after establishing the instruction queues corresponding to the disk controllers on a one-to-one basis, wherein the target disk controller is further configured to write a read or write feedback signal into a back-end feedback queue corresponding to the target disk controller after the read or write operation instruction is completed;

The disk data read or write control system further comprises a reading unit, which is configured to reading the back-end feedback queue corresponding to the target disk controller to acquire the read or write feedback signal of the target disk controller after the control unit writes the read or write operation instruction into the instruction queue corresponding to the target disk controller, to cause the target disk controller to read the read or write operation instruction in the instruction queue and perform the read or write operation on the disk.

Further, the receiving unit is further configured to establish a front-end feedback queue corresponding to the host after establishing the instruction queues corresponding to the disk controllers on a one-to-one basis.

The disk data read or write control system further comprises a first writing unit, which is configured to write the read or write feedback signal into the front-end feedback queue corresponding to the host to cause the host to acquire the read or write feedback signal through the front-end feedback queue after reading the back-end feedback queue corresponding to the target disk controller to acquire the read or write feedback signal of the target disk controller.

Further, the receiving unit is configured to establish a response queue corresponding to the host.

The read or write task request of the host is received.

The disk data read or write control system further comprises a second writing unit, which is configured to write data to be read sent by the target disk controller into the response queue to cause the host to read the data to be read corresponding to the read or write task request from the response queue after the control unit controls, based on the read or write task request, the target disk controller to perform the read or write operation on the disk.

Further, the disk comprises N disk regions corresponding to the N disk controllers on a one-to-one basis.

The determination unit is configured to perform the following operations:

determining a target disk region from the N disk regions corresponding to the read or write task request; and determining the target disk controller corresponding to the target disk region.

Further, before the receiving unit receives the read or write task request of the host, the disk data read or write control system is further configured to perform the following operation:

determining a target link of which a connection state is normal among the links between the front-end shared card and the host; and The receiving unit is configured to perform the following operation:

receiving the read or write task request of the host through the target link.

Further, when a target link of which a connection state is normal among the links between the front-end shared card and the host, the disk data read or write control system is configured to perform the following operations:

detecting a connection state of each of the links between the front-end shared card and the host; and determining the target link of which the connection state is normal.

Further, after the connection state of each of the links between the front-end shared card and the host, the disk data read or write control system is further configured to perform the following operations:

determining whether there is an abnormal link of which the connection state is abnormal among the links; and in a case where it is determined that there is an abnormal link of which the connection state is abnormal among the links, controlling a prompt module for providing a prompt.

Further, the prompt module is a voice prompt module and/or a light prompt module.

When controlling the prompt module for prompt, the disk data read or write control system is configured to perform the following operation:

controlling the voice prompt module for providing a voice prompt and/or controlling the light prompt module for providing a light prompt.

Further, the voice prompt module is a buzzer, and the light prompt module is a light emitting diode.

Further, the control unit is configured to perform the following operations:

converting, based on the write task request, a first format of data to be written corresponding to the write task request into a second format corresponding to the target disk controller, to cause the target disk controller to write the data to be written in the second format into the disk; or converting, based on the read task request, a second format of data to be read corresponding to the read task request into a first format corresponding to the host, to cause the host to read the data to be read in the first format corresponding to the host and sent by the target disk controller.

In order to solve the above technical problem, the present disclosure provides an apparatus of controlling a read or write operation for disk data, including a processor, a memory, a communications interface, and a communications bus. The processor, the memory, and the communications interface communicate with each other via the communications bus.

The memory is configured to store at least one executable instruction, and the executable instruction enables the processor to perform operations of method of controlling a read or write operation for disk data.

In a third aspect, in order to solve the above technical problem, the present disclosure provides a front-end shared card, comprises the disk data read or write control apparatus.

Further, the first end of the front-end shared card is connected with a host through M links, the second end is connected with a disk through N disk controllers, the front-end shared card and each of the disk controllers are connected through a built-in socket, and M and N are integers greater than 1.

In a fourth aspect, in order to solve the above technical problem, the present disclosure provides a non-volatile readable storage medium. The non-volatile readable storage medium stores a computer program. The computer program implements, when being operated by a processor, steps of the method of controlling a read or write operation for disk data.

The present disclosure discloses the method of controlling a read or write operation for disk data, the related component, and the front-end shared card, which relate to the field of host storage control. A first end of the front-end shared card is connected with a host through the M links, and the second end of the front-end shared card is respectively correspondingly connected with the disk through the N disk controllers on a one-to-one basis. The front-end shared card is connected to the disk controllers through the built-in socket of the front-end shared card and the connection is not easy to disconnect, and if any one of the links between the host and the front-end shared card has a fault and is disconnected, the host may still be connected to any one of the disk controllers through the front-end shared card, and therefore, the front-end shared card receives the read or write task request of the host, and controls, based on the read or write task request, the target disk controller to perform the read or write operation on the disk. By providing a front-end shared card, it is ensured that a read or write operation between a host and a disk controller can be executed normally, and a normal connection between the host and the disk controller is also ensured, thereby ensuring the normal operation of a service.

BRIEF DESCRIPTION OF THE DRAWINGS

In order to describe the technical solutions in embodiments of the present disclosure more clearly, the drawings required to be used in the related art and the embodiments will be simply introduced below. It is apparent that the drawings in the following descriptions are only some embodiments of the present disclosure. Those of ordinary skill in the art may further obtain other drawings according to these drawings without creative work.

DETAILED DESCRIPTION OF THE EMBODIMENTS

The core of the present disclosure is to provide a method of controlling a read or write operation for disk data, a related component, and a front-end shared card. By providing a front-end shared card, it is ensured that a read or write operation between a host and a disk controller can be executed normally, and a normal connection between the host and the disk controller is also ensured, thereby ensuring the normal operation of a service.

In order to make objectives, technical solutions, and advantages of embodiments of the present disclosure clearer, the technical solutions in the embodiments of the present disclosure will be clearly and completely described below in combination with the drawings in the embodiments of the present disclosure. It is apparent that the described embodiments are part of the embodiments of the present disclosure, not all the embodiments. All other embodiments obtained by those of ordinary skill in the art on the basis of the embodiments in the present disclosure without creative work all fall within the scope of protection of the present disclosure.

Figure 1:
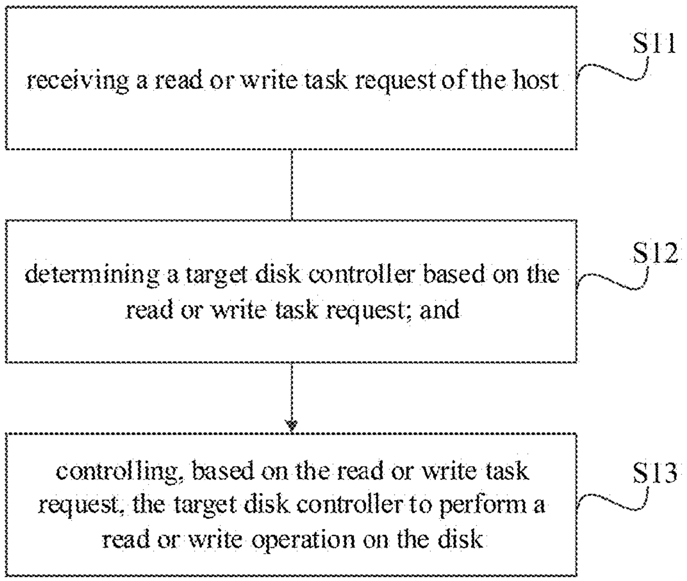
FIG. 1 is a schematic flowchart of a method of controlling a read or write operation for disk data according to some embodiments of the present disclosure.
Figure 2:
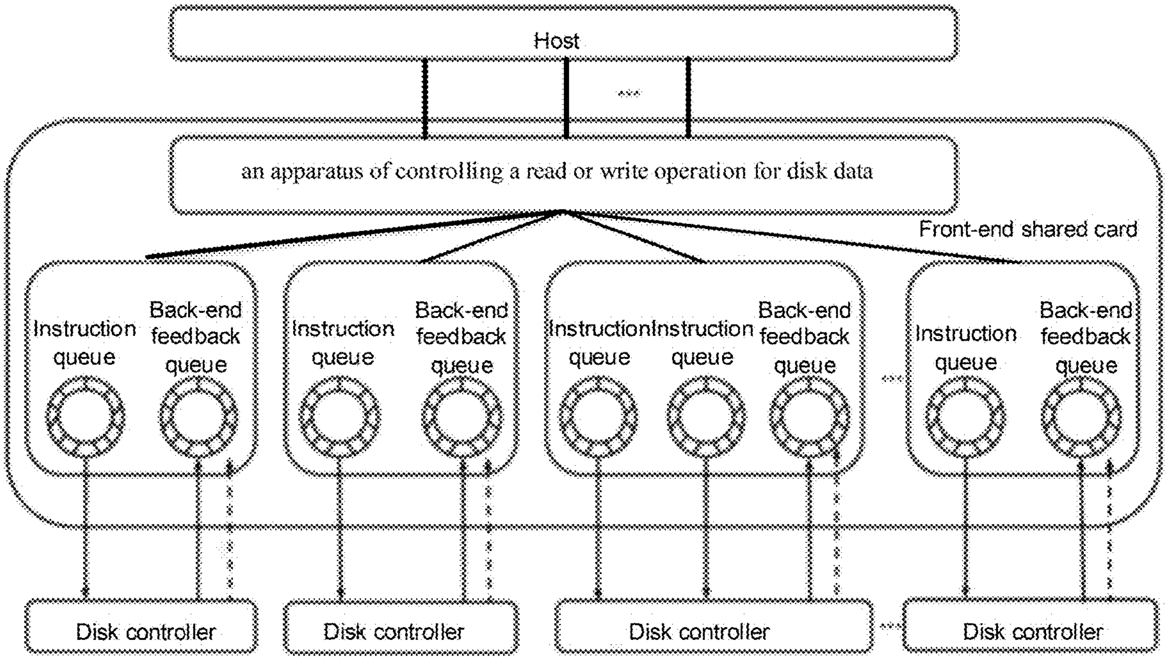
FIG. 2 is a schematic diagram of a connection structure among a front-end shared card, a host and disk controllers according to some embodiments of the present disclosure.

Referring to FIG. 1, FIG. 1 is a schematic flowchart of a method of controlling a read or write operation for disk data according to some embodiments of the present disclosure. The method is applied to a front-end shared card. A first end of the front-end shared card is connected with a host through M links, a second end of the front-end shared card is connected with a disk through N disk controllers, the front-end shared card and each of the disk controllers are connected through a built-in socket, the disk controllers correspond to built-in sockets on a one-to-one basis, and M and N are integers greater than 1. Referring to FIG. 2, FIG. 2 is a schematic diagram of a connection structure among a front-end shared card, a host and disk controllers according to some embodiments of the present disclosure. The method comprises the following steps.

At S11, receiving a read or write task request of the host;

Disk controllers in a host in the related art are respectively connected to each other through links. When the link fails, the disk controller connected to the failed link is unable to execute the read or write task request of the host, resulting in reduction of storage performance, and thus leading to negative consequences caused by service downtime due to inability to execute the read or write task request of the host.

In order to solve the above technical problems, in the present disclosure, the front-end shared card is disposed between the host and the disk controllers, the front-end shared card is connected to the host through the plurality of links. For example, the number of the links between the front-end shared card and the host may be set according to the number of the disk controller, for example, M=N, and the present disclosure is not limited thereto. When any one of the links fails, the links that are not faulty ensure the connection between the host and the front-end shared card, thereby ensuring that the front-end shared card may continuously receive the read or write task request of the host. In addition, since the front-end shared card is connected to the disk controller through the built-in socket, the links formed between the front-end shared card and the disk controller through the built-in socket are shorter and not externally exposed compared to external links between the host and the disk controller in the related art, such that the built-in socket between the front-end shared card and the disk controller is not easy to fail, and the links between the front-end shared card and the disk controller are not easy to disconnect. Based on this, by disposing the front-end shared card, effective communication between the host and the disk controller can be ensured through the front-end shared card, so as to ensure that the disk controller may all be used normally when there is a link fails, thereby ensuring the normal operation of a service.

Optionally, the front-end shared card receives the read or write task request sent by the host after establishing a communication connection with the host and establishing a communication connection with the disk controllers. Definitely, since the front-end shared card is connected to the host through the plurality of links, the front-end shared card may receive the read or write task request sent by the host through any one of the links or through the plurality of links, that is, the front-end shared card may establish the communication connection with the host through one or more links.

The read or write task request comprises an instruction for reading data in the disk and/or an instruction for writing the data to the disk, and further comprises an address corresponding to a reading volume or writing volume of the disk.

As an optional embodiment, the receiving a read or write task request of the host comprises:

- scanning each of the disk controllers connected with the front-end shared card, and establishing a communication connection between the front-end shared card and each of the disk controllers; and
- receiving the read or write task request of the host after establishing a communication connection between the front-end shared card and the host.

Optionally, when establishing the connection between the front-end shared card and each of the disk controllers, the front-end shared card identifies the number of the disk controllers by scanning the disk controllers, establishes connection tasks with the disk controllers, so as to realize the communication connection with the disk controllers, and then receives the read or write task request of the host after establishing the connection with the host.

Based on this, the connection between the front-end shared card and the disk controllers may be guaranteed to avoid inability to normally read and write the disk due to missed connection. Furthermore, by establishing the connection tasks with the disk controllers, the connections with the disk controllers may be separately managed according to the tasks; and the connection state between the front-end shared card and the disk controller can be checked through the connection tasks, facilitating later maintenance.

As an optional embodiment, the receiving the read or write task request of the host after establishing the communication connection between the front-end shared card and the host comprises:

establishing the communication connection between the front-end shared card and the host after receiving a communication connection request of the host; and receiving the read or write task request of the host.

During connection with the host, that is, the connection with the host is established after the connection request of the host is received, for example, when the host needs to process a storage task after being powered on, the connection request is sent to the front-end shared card. Correspondingly, the connection task with the host may also be set in the front-end shared card, so as to check the connection state between the front-end shared card and the host through the connection task, facilitating later maintenance.

At S12, determining a target disk controller from the N disk controllers based on the read or write task request; and At S13, controlling, based on the read or write task request, the target disk controller to perform a read or write operation on the disk. wherein the based on the read or write task request, the target disk controller to perform a read or write operation on the disk comprises: controlling, based on the read task request, the target disk controller to perform a read operation on the disk, and controlling, based on the write task request, the target disk controller to perform a write operation on the disk.

After the read or write task request is received, the target disk controller performs the read or write operation on the disk by determining the target disk controller corresponding to the read or write task request. Definitely, the same read or write task request may correspond to the plurality of target disk controllers to simultaneously control the plurality of target disk controllers to perform the read or write operation on the disk, thereby improving storage performance.

It is to be noted that, the front-end shared card in the present disclosure may be, but not limited to, implemented by using a Smart Network Interface Card (SmartNIC). The receiving of the read or write task request and the controlling of the target disk controller may be realized through a Remote Direct Memory Access (RDMA) over Converged Ethernet (RoCE) function in the SmartNIC. In addition, the establishment of subsequent queues and the conversion of data formats may also be implemented by the ROCE function in the SmartNIC. However, a difference between the front-end shared card in the present disclosure and an intelligent Ethernet card lies in that, the intelligent Ethernet card is disposed between a disk controller and a disk. Since one disk controller may be connected to a plurality of disks, when the disk controller performs data reading or data writing on different disks, a communication connection and physical connection with different disks need to be established through the intelligent Ethernet card, so as to receive data of a target disk position or write the data to the target disk position through the intelligent Ethernet card, that is, the intelligent Ethernet card is a medium between the disk controller and the disk, the intelligent Ethernet card corresponds to the disk controllers on a one-to-many basis. Since a one-to-many connection is also required between the host and the disk controllers, in the present disclosure, a function and structure of a one-to-many transmission request may be used, after the host issues the read or write task request to the front-end shared card, the front-end shared card may determine the disk controller that reads or writes the data to the position as the target disk controller according to a disk region position corresponding to data to be read or written in the read or write task request, for example, different volume positions on the disk, and convert the corresponding read or write task instructions to send to a target controller. Based on this, the front-end shared card realizes one-to-many medium transmission between the host and the disk controllers.

To sum up, in this embodiment, the first ends of the front-end shared card are connected to a host via the M links, and the second ends are connected to the disk via the N disk controllers. The front-end shared card is connected to the disk controllers through the built-in socket of the front-end shared card and the connection is not easy to disconnect, and if any one of the links between the host and the front-end shared card has a fault and is disconnected, the host may still be connected to any one of the disk controllers through the front-end shared card, and therefore, the front-end shared card receives the read or write task request of the host, and controls, based on the read or write task request, the target disk controller to perform the read or write operation on the disk. By providing a front-end shared card, it is ensured that a read or write operation between a host and a disk controller can be executed normally, and a normal connection between the host and the disk controller is also ensured, thereby ensuring the normal operation of a service.

On the basis of the above embodiments:

as an optional embodiment, the receiving a read or write task request of the host comprises:

establishing a request queue corresponding to the host; and reading the read or write task request that is written in the request queue (RecvQ) by the host.

In this embodiment, after the connection is established with the host and the disk controller, in order to receive the read or write task request of the host, the request queue corresponding to the host is established, such that the host may write the read or write task request to the request queue, and the front-end shared card may read the read or write task request that is written to the request queue by the host.

Optionally, when the host needs to simultaneously send the plurality of read or write task requests, the read or write task requests may be written to the front-end shared card in sequence, thereby improving storage efficiency. Furthermore, by establishing the request queue, it can ensure that the front-end shared card can timely receive the read or write task request sent by the host, and timely transmit the read or write task request to the target disk controller.

As an optional embodiment, the receiving a read or write task request of the host comprises:

establishing instruction queues (SQ) corresponding to the disk controllers on a one-to-one basis; and receiving the read or write task request of the host;

the controlling, based on the read or write task request, the target disk controller to perform a read or write operation on the disk comprises:

converting the read or write task request into a read or write operation instruction; and writing the read or write operation instruction into an instruction queue corresponding to the target disk controller, to cause the target disk controller to read the read or write operation instruction in the instruction queue and perform the read or write operation on the disk.

In this embodiment, after the connection is established with the host and the disk controller, the instruction queues respectively corresponding to the disk controllers are also established. After determining the target disk controller according to the read or write task request, the front-end shared card converts the read or write task request into the read or write operation instruction, and writes the read or write operation instruction to the instruction queue corresponding to the target disk controller. The target disk may perform the read or write operation on the disk according to the read or write operation instruction by reading the read or write operation instruction in its own corresponding instruction queue.

Based on this, by establishing the instruction queue, the disk controller may read the corresponding instruction queues at a certain cycle to determine whether there is the read or write operation instruction required to be performed, so as to achieve the read or write operation of the disk, thereby improving storage efficiency.

Definitely, each disk controller may correspond to more than one instruction queues, as shown in FIG. 2.

As an optional embodiment, after establishing the instruction queues corresponding to the disk controllers on a one-to-one basis, the method further comprises:

establishing back-end feedback queues (back-end CQ) corresponding to the disk controllers on a one-to-one basis, wherein the target disk controller is further configured to write a read or write feedback signal into a back-end feedback queue corresponding to the target disk controller after the read or write operation instruction is completed;

after writing the read or write operation instruction into the instruction queue corresponding to the target disk controller, to cause the target disk controller to read the read or write operation instruction in the instruction queue and perform the read or write operation on the disk, the method further comprises:

reading the back-end feedback queue corresponding to the target disk controller to acquire the read or write feedback signal of the target disk controller.

In this embodiment, the front-end shared card also establishes the back-end CQs respectively corresponding to the target disk controllers, and the CQs are configured to receive the read or write feedback signal of the target disk controller after the read or write operation is completed, so as to determine the completion of the read or write operation instruction by the target disk controller, facilitating management of a storage process of the target disk controller.

As an optional embodiment, after establishing the instruction queues corresponding to the disk controllers on a one-to-one basis, the method further comprises:

establishing a front-end feedback queue corresponding to the host;

after reading the back-end feedback queue corresponding to the target disk controller to acquire the read or write feedback signal of the target disk controller, the method further comprises:

writing the read or write feedback signal into the front-end feedback queue (front-end CQ) corresponding to the host to cause the host to acquire the read or write feedback signal through the front-end feedback queue.

In this embodiment, in order to cause the host to timely acquire the execution of the read or write operation instruction by the target disk controller, the front-end shared card also establishes the front-end feedback queue corresponding to the host, and then writes the read or write feedback signal to the front-end feedback queue corresponding to the host when receiving the read or write feedback signal sent by the target disk controller, causing the host to allocate operations according to the execution of the read or write operation instruction by the target disk controller, thereby improving storage efficiency.

In addition, the connection task with the host in the front-end shared card may be Task 1, and the connection tasks with the disk controllers may respectively be Task 2, . . . , N+1. After the Task 1 is established, the Task 1 may establish a QP resource in the front-end shared card, for example, the response queue (SendQ), the request queue, and the front-end feedback queue, and the Task 2, . . . , N+1 may establish the instruction queue and back-end feedback queue corresponding to the disk controllers, so as to realize the management of different queues through different tasks. It is to be further noted that, when the instruction queue and back-end feedback queue corresponding to the disk controllers are established, establishment may be performed by using a Non Volatile Memory Host Controller Interface Specification (NVMe) protocol.

As an optional embodiment, the receiving a read or write task request of the host comprises:

establishing a response queue corresponding to the host; and receiving the read or write task request of the host;

after controlling, based on the read or write task request, the target disk controller to perform a read or write operation on the disk, the method further comprises:

writing data to be read sent by the target disk controller into the response queue to cause the host to read the data to be read corresponding to the read or write task request from the response queue.

In this embodiment, by establishing the response queue corresponding to the host, the front-end shared card write the data to be read that is acquired from the disk by the target disk controller based on the read or write task request to the response queue corresponding to the host, and the host may acquire the corresponding data to be read from the response queue, such that the front-end shared card is prevented from directly sending the data to be read to the host to affect normal services of the host.

Based on this, the response queue, request queue, and front-end feedback queue that correspond to the host and are established by the front-end shared card may all prevent the front-end shared card from directly sending the corresponding data to affect the normal operation of the host due to the interruption of the normal service of the host, and the host acquires the corresponding data from the queues established by the front-end shared card according to the arrangement of self-services, thereby guaranteeing the normal operation of the host.

As an optional embodiment, the disk comprises N disk regions corresponding to the N disk controllers on a one-to-one basis; and the determining a target disk controller from the N disk controllers based on the read or write task request comprises:

determining a target disk region from the N disk regions corresponding to the read or write task request; and determining the target disk controller corresponding to the target disk region.

In this embodiment, each disk controller may correspondingly store or read or write one disk region in the disk. Definitely, in the present disclosure, the plurality of disks may constitute a disk array, each disk controller corresponds to one disk region in the disk array, and the present disclosure is not limited thereto. It is to be noted that, different disk regions may be one volume region in the disk.

Based on the above corresponding relationship, in the present disclosure, when the target disk controller is determined, by determining the target disk region corresponding to the read or write task request, that is, the target disk region of the data to be read or written corresponding to the read or write task request, the target disk controller may be determined according to the one-to-one correspondence relationship between the disk region and the target disk controller. For example, the disk array is divided into an a-volume region, a b-volume region, and a c-volume region. The target disk region of the corresponding data to be read or written included in the read or write task request is the a-volume region, then the disk controller corresponding to the a-volume region is determined as the target disk controller, and the read or write task request may be converted and sent to the target disk controller.

Based on this, by causing each disk controller to correspond to one disk region, the plurality of disk controllers are prevented from simultaneously performing the read or write operation on the same disk region, leading to data errors caused by repeated writing of the data in the disk region.

As an optional embodiment, before receiving the read or write task request of the host, the method further comprises:

determining a target link of which a connection state is normal among the links between the front-end shared card and the host; and the receiving a read or write task request of the host comprises:

receiving the read or write task request of the host through the target link.

In this embodiment, considering that the front-end shared card is connected to the host via the plurality of links, but when receiving the read or write task request of the host, the front-end shared card needs to receive the read or write task request via the link of which connection state is normal, and if the receiving is performed via the link of which connection state is abnormal, the receiving of the read or write task request fails or an abnormal read or write task request is received. Based on this, before the read or write task request is received, in this embodiment, the target link of which connection state is normal is determined first, and the target link receives the read or write task request to ensure that the received read or write task request is an accurate request, so as to perform an accurate read or write operation.

As an optional embodiment, the determining a target link of which a connection state is normal among the links between the front-end shared card and the host comprises:

detecting a connection state of each of the links between the front-end shared card and the host; and determining the target link of which the connection state is normal.

Optionally, when the target link is determined, the connection state of each link needs to be traversed to determine the connection state of each link, so as to select, from the links, the link of which connection state is normal as the target link to receive the read or write task request.

Definitely, the plurality of links may be determined as the target links at the same time to redundantly receive the plurality of read or write task requests, thereby guaranteeing the accuracy and completeness of the read or write task requests received.

As an optional embodiment, after detecting the connection state of each of the links between the front-end shared card and the host, the method further comprises:

determining whether there is an abnormal link of which the connection state is abnormal among the links; and in a case where it is determined that there is an abnormal link of which the connection state is abnormal among the links, controlling a prompt module for providing a prompt.

In this embodiment, if an abnormal link of which connection state is abnormal is detected, the read or write task request is not received via the abnormal link, and the prompt module is controlled for prompt, so as to cause working personnel to maintain the abnormal link after seeing the prompt, thereby guaranteeing the normal receiving of the read or write task request.

As an optional embodiment, the prompt module is a voice prompt module and/or a light prompt module; and the controlling a prompt module for providing a prompt comprises:

controlling the voice prompt module for providing a voice prompt and/or controlling the light prompt module for providing a light prompt.

In this embodiment, the prompt module may be the voice prompt module, or may also be the light prompt module, or may also be collaborative prompt of the voice prompt module and the light prompt module. If an environment is complex and is not convenient to check the light prompt module, the voice prompt module may prompt the working personnel that there is an abnormal link through voice; and when the environment is noisy, the working personnel may be informed of the abnormal link and maintenance through light prompt of the light prompt module.

As an optional embodiment, the voice prompt module is a buzzer, and the light prompt module is a light emitting diode.

Considering that the buzzer and light emitting diode are low in cost and simple in control mode, in this embodiment, the buzzer is used as the voice prompt module, and the light emitting diode is used as the light prompt module.

Definitely, the voice prompt module may also be a speaker, the light prompt module may be a display screen, and each link may be provided with the corresponding voice prompt module and light prompt module, such that the working personnel positions the abnormal link conveniently.

As an optional embodiment, the controlling, based on the read or write task request, the target disk controller to perform a read or write operation on the disk comprises:

converting, based on the write task request, a first format of data to be written corresponding to the write task request into a second format corresponding to the target disk controller, to cause the target disk controller to write the data to be written in the second format into the disk; or converting, based on the read task request, a second format of data to be read corresponding to the read task request into a first format corresponding to the host, to cause the host to read the data to be read in the first format corresponding to the host and sent by the target disk controller.

Considering that the data format between the host and the disk may be different, in order to avoid data loss or error due to different data formats after the data is read or written, in this embodiment, when the read or write task request is to write the data to be written to the disk, the data to be written of which data format is the first format corresponding to the host is converted into the data to be written in the second format corresponding to the disk, and the data to be written in the second format is sent to the target disk controller, such that the target disk controller writes the data to be written in the second format to the disk.

Alternatively, when the read or write task request is to read the data to be read in the disk, the front-end shared card converts the data to be read that is in the second format corresponding to the disk and acquired by the target disk controller into the data to be read in the first format corresponding to the host, thereby ensuring that the data to be read that is read by the host is correct data to be read that may be directly processed by the host.

Based on this, through the conversion of the data formats, a normal data transmission between the host and the disk can be guaranteed, thereby improving data transmission efficiency.

Figure 3:
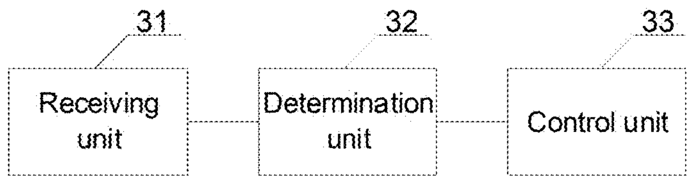
FIG. 3 is a schematic structural diagram of a disk data read or write control system according to some embodiments of the present disclosure.

Referring to FIG. 3, FIG. 3 is a schematic structural diagram of a disk data read or write control system according to some embodiments of the present disclosure. The system comprises a receiving unit 31, a determination unit 32, and a control unit 33.

In an optional implementation, the receiving unit 31 is configured to perform the following operations:

scanning each of the disk controllers connected with the front-end shared card, and establishing a communication connection between the front-end shared card and each of the disk controllers; and receiving the read or write task request of the host after establishing a communication connection between the front-end shared card and the host.

In an optional implementation, the receiving unit 31 is configured to perform the following operations:

establishing the communication connection between the front-end shared card and the host after receiving a communication connection request of the host; and receiving the read or write task request of the host.

In an optional implementation, the receiving unit 31 is configured to perform the following operations:

establishing a request queue corresponding to the host; and reading the read or write task request that is written in the request queue by the host.

In an optional implementation, the receiving unit 31 is configured to perform the following operations:

establishing instruction queues corresponding to the disk controllers on a one-to-one basis; and receiving the read or write task request of the host;

The control unit 33 is configured to perform the following operations:

converting the read or write task request into a read or write operation instruction; and writing the read or write operation instruction into an instruction queue corresponding to the target disk controller, to cause the target disk controller to read the read or write operation instruction in the instruction queue and perform the read or write operation on the disk.

In an optional implementation, the receiving unit 31 is further configured to establish back-end feedback queues corresponding to the disk controllers on a one-to-one basis after establishing the instruction queues corresponding to the disk controllers on a one-to-one basis.

The target disk controller is further configured to write a read or write feedback signal into a back-end feedback queue corresponding to the target disk controller after the read or write operation instruction is completed.

The disk data read or write control system further comprises a reading unit, which is configured to reading the back-end feedback queue corresponding to the target disk controller to acquire the read or write feedback signal of the target disk controller after the control unit 33 writes the read or write operation instruction into the instruction queue corresponding to the target disk controller, to cause the target disk controller to read the read or write operation instruction in the instruction queue and perform the read or write operation on the disk.

In an optional implementation, the receiving unit 31 is further configured to establish a front-end feedback queue corresponding to the host after establishing the instruction queues corresponding to the disk controllers on a one-to-one basis.

The disk data read or write control system further comprises a first writing unit, which is configured to write the read or write feedback signal into the front-end feedback queue corresponding to the host to cause the host to acquire the read or write feedback signal through the front-end feedback queue after the reading unit reads the back-end feedback queue corresponding to the target disk controller to acquire the read or write feedback signal of the target disk controller.

In an optional implementation, the receiving unit 31 is configured to establish a response queue corresponding to the host and receive the read or write task request of the host.

The disk data read or write control system further comprises a second writing unit, which is configured to write data to be read sent by the target disk controller into the response queue to cause the host to read the data to be read corresponding to the read or write task request from the response queue after the control unit 33 controls, based on the read or write task request, the target disk controller to perform the read or write operation on the disk.

In an optional implementation, the disk comprises N disk regions corresponding to the N disk controllers on a one-to-one basis.

The determination unit 32 is configured to perform the following operations:

determining a target disk region from the N disk regions corresponding to the read or write task request; and determining the target disk controller corresponding to the target disk region.

In an optional implementation, before the receiving unit 31 receives the read or write task request of the host, the disk data read or write control system is further configured to perform the following operation:

determining a target link of which a connection state is normal among the links between the front-end shared card and the host;

The receiving unit 31 is configured to perform the following operation:

receiving the read or write task request of the host through the target link.

In an optional implementation, when determining the target link of which connection state is normal among the links with the host, the disk data read or write control system is configured to perform the following operations:

detecting a connection state of each of the links between the front-end shared card and the host; and determining the target link of which the connection state is normal.

In an optional implementation, after detecting the connection states of the links connected with the host, the disk data read or write control system is further configured to perform the following operations:

determining whether there is an abnormal link of which the connection state is abnormal among the links; and in a case where it is determined that there is an abnormal link of which the connection state is abnormal among the links, controlling a prompt module for providing a prompt.

In an optional implementation, the prompt module is a voice prompt module and/or a light prompt module.

When controlling the prompt module for prompt, the disk data read or write control system is configured to perform the following operation:

controlling the voice prompt module for providing a voice prompt and/or controlling the light prompt module for providing a light prompt.

In an optional implementation, the voice prompt module is a buzzer, and the light prompt module is a light emitting diode.

In an optional implementation, the control unit 33 is configured to perform the following operations:

converting, based on the write task request, a first format of data to be written corresponding to the write task request into a second format corresponding to the target disk controller, to cause the target disk controller to write the data to be written in the second format into the disk; or converting, based on the read task request, a second format of data to be read corresponding to the read task request into a first format corresponding to the host, to cause the host to read the data to be read in the first format corresponding to the host and sent by the target disk controller.

The introduction of the disk data read or write control system provided in the present disclosure refers to the above method embodiments, and details are not described in the present disclosure again.

Figure 4:
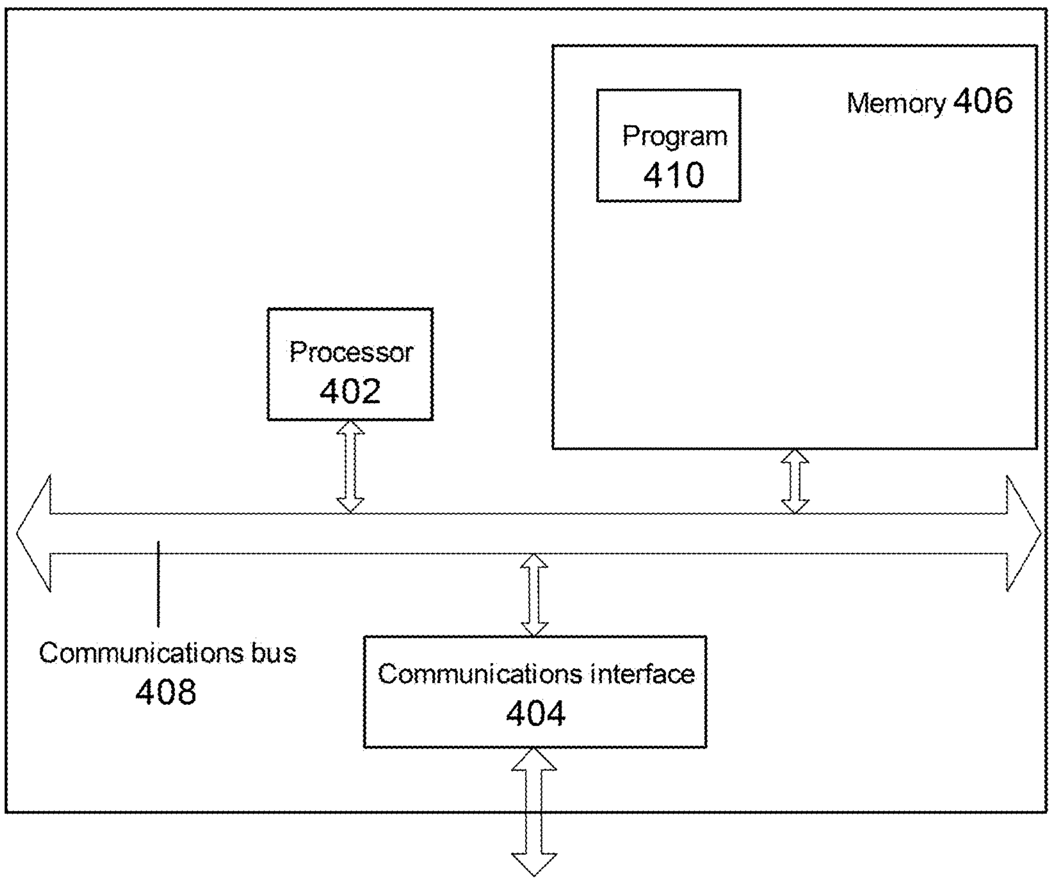
FIG. 4 is a schematic structural diagram of a disk data read or write control apparatus according to some embodiments of the present disclosure.

Referring to FIG. 4, FIG. 4 is a schematic structural diagram of a disk data read or write control apparatus according to some embodiments of the present disclosure. The implementation of the disk data read or write control apparatus is not limited in the optional embodiments of the present disclosure.

As shown in FIG. 4, the disk data read or write control apparatus may include a processor 402, a communications interface 404, a memory 406, and a communications bus 408.

The processor 402, the communications interface 404, and the memory 406 communicate with each other via the communications bus 408. The communications interface 404 is configured to communicate with other devices such as network elements such as clients or other servers. The processor 402 is configured to execute a program 410, and may execute related steps for the disk data read or write control method embodiment.

Optionally, the program 410 may include a program code, and the program code comprises a computer executable instruction.

The processor 402 may be a Central Processing Unit (CPU), or an disclosure Specific Integrated Circuit ASIC), or one or more integrated circuits configured to implement the embodiments of the present disclosure. The one or more processors included in the disk data read or write control apparatus may be the same type of processors, for example, one or more CPUs, or may also be different types of processors, for example, one or more CPUs or one or more ASICs.

The memory 406 is configured to store the program 410. The memory 406 may include a high-speed RAM memory, or may further include a non-volatile memory, for example, at least one magnetic disk memory.

The program 410 may be called by the processor 402 to cause the disk data read or write control apparatus to execute the following operations:

receiving a read or write task request of the host;

determining a target disk controller from the N disk controllers based on the read or write task request; and controlling, based on the read or write task request, the target disk controller to perform a read or write operation on the disk.

In an optional implementation, the program 410 is called by the processor 402 to cause the disk data read or write control apparatus to execute the following operations:

the receiving a read or write task request of the host comprises:

scanning each of the disk controllers connected with the front-end shared card, and establishing a communication connection between the front-end shared card and each of the disk controllers; and receiving the read or write task request of the host after establishing a communication connection between the front-end shared card and the host.

In an optional implementation, the program 410 is called by the processor 402 to cause the disk data read or write control apparatus to execute the following operations:

the receiving the read or write task request of the host after establishing the communication connection between the front-end shared card and the host comprises:

establishing the communication connection between the front-end shared card and the host after receiving a communication connection request of the host; and receiving the read or write task request of the host.

In an optional implementation, the program 410 is called by the processor 402 to cause the disk data read or write control apparatus to execute the following operations:

the receiving a read or write task request of the host comprises:

establishing a request queue corresponding to the host; and reading the read or write task request that is written in the request queue by the host.

In an optional implementation, the program 410 is called by the processor 402 to cause the disk data read or write control apparatus to execute the following operations:

the receiving a read or write task request of the host comprises:

establishing instruction queues corresponding to the disk controllers on a one-to-one basis; and receiving the read or write task request of the host;

the controlling, based on the read or write task request, the target disk controller to perform a read or write operation on the disk comprises:

converting the read or write task request into a read or write operation instruction; and writing the read or write operation instruction into an instruction queue corresponding to the target disk controller, to cause the target disk controller to read the read or write operation instruction in the instruction queue and perform the read or write operation on the disk.

In an optional implementation, the program 410 is called by the processor 402 to cause the disk data read or write control apparatus to execute the following operations:

after establishing the instruction queues corresponding to the disk controllers on a one-to-one basis, the method further comprises:

establishing back-end feedback queues corresponding to the disk controllers on a one-to-one basis, wherein the target disk controller is further configured to write a read or write feedback signal into a back-end feedback queue corresponding to the target disk controller after the read or write operation instruction is completed;

after writing the read or write operation instruction into the instruction queue corresponding to the target disk controller, to cause the target disk controller to read the read or write operation instruction in the instruction queue and perform the read or write operation on the disk, the method further comprises:

reading the back-end feedback queue corresponding to the target disk controller to acquire the read or write feedback signal of the target disk controller.

In an optional implementation, the program 410 is called by the processor 402 to cause the disk data read or write control apparatus to execute the following operations:

after establishing the instruction queues corresponding to the disk controllers on a one-to-one basis, the method further comprises:

establishing a front-end feedback queue corresponding to the host;

after reading the back-end feedback queue corresponding to the target disk controller to acquire the read or write feedback signal of the target disk controller, the method further comprises:

writing the read or write feedback signal into the front-end feedback queue corresponding to the host to cause the host to acquire the read or write feedback signal through the front-end feedback queue.

The read or write feedback signal is written into the front-end feedback queue corresponding to the host to cause the host to acquire the read or write feedback signal through the front-end feedback queue.

In an optional implementation, the program 410 is called by the processor 402 to cause the disk data read or write control apparatus to execute the following operations:

establishing a response queue corresponding to the host; and receiving the read or write task request of the host;

after controlling, based on the read or write task request, the target disk controller to perform a read or write operation on the disk, the method further comprises:

writing data to be read sent by the target disk controller into the response queue to cause the host to read the data to be read corresponding to the read or write task request from the response queue.

In an optional implementation, the program 410 is called by the processor 402 to cause the disk data read or write control apparatus to execute the following operations:

the disk comprises N disk regions corresponding to the N disk controllers on a one-to-one basis; and the determining a target disk controller from the N disk controllers based on the read or write task request comprises:

determining a target disk region from the N disk regions corresponding to the read or write task request; and determining the target disk controller corresponding to the target disk region.

In an optional implementation, the program 410 is called by the processor 402 to cause the disk data read or write control apparatus to execute the following operations:

before receiving the read or write task request of the host, the method further comprises:

determining a target link of which a connection state is normal among the links between the front-end shared card and the host; and the receiving a read or write task request of the host comprises:

receiving the read or write task request of the host through the target link.

In an optional implementation, the program 410 is called by the processor 402 to cause the disk data read or write control apparatus to execute the following operations:

the determining a target link of which a connection state is normal among the links between the front-end shared card and the host comprises:

detecting a connection state of each of the links between the front-end shared card and the host; and determining the target link of which the connection state is normal.

In an optional implementation, the program 410 is called by the processor 402 to cause the disk data read or write control apparatus to execute the following operations:

after detecting the connection state of each of the links between the front-end shared card and the host, the method further comprises:

determining whether there is an abnormal link of which the connection state is abnormal among the links; and in a case where it is determined that there is an abnormal link of which the connection state is abnormal among the links, controlling a prompt module for providing a prompt.

In an optional implementation, the program 410 is called by the processor 402 to cause the disk data read or write control apparatus to execute the following operations:

the prompt module is a voice prompt module and/or a light prompt module; and the controlling a prompt module for providing a prompt comprises:

controlling the voice prompt module for providing a voice prompt and/or controlling the light prompt module for providing a light prompt.

In an optional implementation, the voice prompt module is a buzzer, and the light prompt module is a light emitting diode.

In an optional implementation, the program 410 is called by the processor 402 to cause the disk data read or write control apparatus to execute the following operations:

the controlling, based on the read or write task request, the target disk controller to perform a read or write operation on the disk comprises:

converting, based on the write task request, a first format of data to be written corresponding to the write task request into a second format corresponding to the target disk controller, to cause the target disk controller to write the data to be written in the second format into the disk; or converting, based on the read task request, a second format of data to be read corresponding to the read task request into a first format corresponding to the host, to cause the host to read the data to be read in the first format corresponding to the host and sent by the target disk controller.

The introduction of the disk data read or write control apparatus provided in the present disclosure refers to the above method embodiments, and details are not described in the present disclosure again.

In order to solve the above technical problem, the present disclosure provides a front-end shared card, including the disk data read or write control apparatus.

As an optional embodiment, a first end of the front-end shared card is connected with a host through M links, a second end of the front-end shared card is connected with a disk through N disk controllers, the front-end shared card and each of the disk controllers are connected through a built-in socket, the disk controllers correspond to built-in sockets on a one-to-one basis, and M and N are integers greater than 1.

The front-end shared card in the present disclosure receives the read or write task request of the host, determines, based on the read or write task request, the target disk controller corresponding to the read or write task request, and controls the target disk controller to read and write the disk based on the read or write task request. Optionally, when the front-end shared card controls the disk controller, the read or write operation instruction is actually sent to the target disk controller, and the target disk controller itself performs the read or write operation according to the read or write operation instruction.

In addition, since the front-end shared card is connected to the host via the plurality of links in the present disclosure, the probability of complete failure of the links connected between the front-end shared card and the host reduces, even though one of the links fails to communicate, other normal links may also be used for communication, such that a failure rate of communication with the host is reduced compared to the related art. Moreover, since the front-end shared card is connected to the disk controller through the built-in socket, a link distance between the front-end shared card and the disk controller is short and even may be negligible, such that the link between the front-end shared card and the disk controller is not prone to failure, and the front-end shared card and the disk controller may normally communicate with each other.

Based on this, by disposing the front-end shared card between the host and the disk controller, more links do not need to be arranged between the host and each disk controller, so as to avoid communication interruption, thereby improving the communication efficiency between the host and the disk controller, and accordingly, disordered links due to the increasing of the links is avoided.

The introduction of the front-end shared card provided in the present disclosure refers to the above method embodiments, and details are not described in the present disclosure again.

The non-volatile readable storage medium in the present disclosure stores a computer program. The computer program implements, when being operated by a processor, steps of the method of controlling a read or write operation for disk data.

The introduction of the non-volatile readable storage medium provided in the present disclosure refers to the above method embodiments, and details are not described in the present disclosure again.

It is also to be noted that relational terms such as first and second are used merely to distinguish one entity or operation from another entity or operation herein, and do not necessarily require or imply the existence of any such actual relationship or order between these entities or operations. Furthermore, terms “comprise”, “include” or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase “comprising one” does not exclude existence of other same elements in the process, the method, the article, or the device that includes the elements.

The foregoing description of the disclosed embodiments enables those skilled in the art to implement or use the present disclosure. It is apparent that those skilled in the art will make many modifications to these embodiments, the general principles defined in the disclosure may be achieved in the other embodiments without departing from the spirit or scope of the present disclosure. Therefore, the present disclosure will not be limited to the embodiments shown herein, but to conform to the maximum extent of principles and new features that are disclosed herein.

What is claimed is:

1. A method of controlling a read or write operation for disk data, applied to a front-end shared card, wherein a first end of the front-end shared card is connected with a host through M links, a second end of the front-end shared card is connected with a disk through N disk controllers, the front-end shared card and each of the disk controllers are connected through a built-in socket, and M and N are integers greater than 1, the front-end shared card establish the communication connection with the host through one or more links of the M links; and the method comprises:

receiving a read or write task request of the host;

determining a target disk controller from the N disk controllers based on the read or write task request; and controlling, based on the read or write task request, the target disk controller to perform a read or write operation on the disk;

wherein the receiving a read or write task request of the host comprises: establishing instruction queues corresponding to the disk controllers on a one-to-one basis; and receiving the read or write task request of the host;

the controlling, based on the read or write task request, the target disk controller to perform a read or write operation on the disk comprises: converting the read or write task request into a read or write operation instruction; and writing the read or write operation instruction into an instruction queue corresponding to the target disk controller, to cause the target disk controller to read the read or write operation instruction in the instruction queue and perform the read or write operation on the disk.

2. The method according to claim 1, wherein the receiving a read or write task request of the host comprises:

scanning each of the disk controllers connected with the front-end shared card, and establishing a communication connection between the front-end shared card and each of the disk controllers; and receiving the read or write task request of the host after establishing a communication connection between the front-end shared card and the host.

3. The method according to claim 2, wherein the receiving the read or write task request of the host after establishing the communication connection between the front-end shared card and the host comprises:

establishing the communication connection between the front-end shared card and the host after receiving a communication connection request of the host; and receiving the read or write task request of the host.

4. The method according to claim 1, wherein the receiving a read or write task request of the host comprises:

establishing a request queue corresponding to the host; and reading the read or write task request that is written in the request queue by the host.

5. The method according to claim 1, wherein after establishing the instruction queues corresponding to the disk controllers on a one-to-one basis, the method further comprises:

establishing back-end feedback queues corresponding to the disk controllers on a one-to-one basis, wherein the target disk controller is further configured to write a read or write feedback signal into a back-end feedback queue corresponding to the target disk controller after the read or write operation instruction is completed;

after writing the read or write operation instruction into the instruction queue corresponding to the target disk controller, to cause the target disk controller to read the read or write operation instruction in the instruction queue and perform the read or write operation on the disk, the method further comprises:

reading the back-end feedback queue corresponding to the target disk controller to acquire the read or write feedback signal of the target disk controller.

6. The method according to claim 5, wherein after establishing the instruction queues corresponding to the disk controllers on a one-to-one basis, the method further comprises:

establishing a front-end feedback queue corresponding to the host;

after reading the back-end feedback queue corresponding to the target disk controller to acquire the read or write feedback signal of the target disk controller, the method further comprises:

writing the read or write feedback signal into the front-end feedback queue corresponding to the host to cause the host to acquire the read or write feedback signal through the front-end feedback queue.

7. The method according to claim 1, wherein the receiving a read or write task request of the host comprises:

establishing a response queue corresponding to the host; and receiving the read or write task request of the host;

after controlling, based on the read or write task request, the target disk controller to perform a read or write operation on the disk, the method further comprises:

writing data to be read sent by the target disk controller into the response queue to cause the host to read the data to be read corresponding to the read or write task request from the response queue.

8. The method according to claim 1, wherein the disk comprises N disk regions corresponding to the N disk controllers on a one-to-one basis; and the determining a target disk controller from the N disk controllers based on the read or write task request comprises:

determining a target disk region from the N disk regions corresponding to the read or write task request; and determining the target disk controller corresponding to the target disk region.

9. The method according to claim 1, wherein before receiving the read or write task request of the host, the method further comprises:

determining a target link of which a connection state is normal among the links between the front-end shared card and the host; and the receiving a read or write task request of the host comprises:

receiving the read or write task request of the host through the target link.

10. The method according to claim 9, wherein the determining a target link of which a connection state is normal among the links between the front-end shared card and the host comprises:

detecting a connection state of each of the links between the front-end shared card and the host; and determining the target link of which the connection state is normal.

11. The method according to claim 10, wherein after detecting the connection state of each of the links between the front-end shared card and the host, the method further comprises:

determining whether there is an abnormal link of which the connection state is abnormal among the links; and in a case where it is determined that there is an abnormal link of which the connection state is abnormal among the links, controlling a prompt module for providing a prompt.

12. The method according to claim 11, wherein the prompt module is a voice prompt module and/or a light prompt module; and the controlling a prompt module for providing a prompt comprises:

controlling the voice prompt module for providing a voice prompt and/or controlling the light prompt module for providing a light prompt.

13. The method according to claim 12, wherein the voice prompt module is a buzzer, and the light prompt module is a light emitting diode.

14. The method according to claim 1, wherein the controlling, based on the read or write task request, the target disk controller to perform a read or write operation on the disk comprises:

converting, based on the write task request, a first format of data to be written corresponding to the write task request into a second format corresponding to the target disk controller, to cause the target disk controller to write the data to be written in the second format into the disk; or converting, based on the read task request, a second format of data to be read corresponding to the read task request into a first format corresponding to the host, to cause the host to read the data to be read in the first format corresponding to the host and sent by the target disk controller.

15. An apparatus of controlling a read or write operation for disk data, comprising a processor, a memory, a communications interface, and a communications bus, wherein the processor, the memory, and the communications interface communicate with each other via the communications bus; and the memory is configured to store at least one executable instruction, and the executable instruction enables the processor to perform operations of the disk data read or write control method according to claim 1.

16. A front-end shared card, comprising the apparatus of controlling a read or write operation for disk data according to claim 15.

17. The front-end shared card according to claim 16, wherein a first end of the front-end shared card is connected with a host through M links, a second end is connected with a disk through N disk controllers, the front-end shared card and each of the disk controllers are connected through a built-in socket, and M and N are integers greater than 1.

18. A non-transitory readable storage medium, having a computer program stored thereon, wherein the computer program implements, when being operated by a processor, steps of the method of controlling a read or write operation for disk data according to claim 1.

19. The method according to claim 2, wherein the controlling, based on the read or write task request, the target disk controller to perform a read or write operation on the disk comprises:

converting, based on the write task request, a first format of data to be written corresponding to the write task request into a second format corresponding to the target disk controller, to cause the target disk controller to write the data to be written in the second format into the disk; or converting, based on the read task request, a second format of data to be read corresponding to the read task request into a first format corresponding to the host, to cause the host to read the data to be read in the first format corresponding to the host and sent by the target disk controller.

* * * * *